(12) United States Patent
Kim

(10) Patent No.: US 10,054,758 B2
(45) Date of Patent: Aug. 21, 2018

(54) CAMERA MODULE HAVING A BALL DISTANCE MAINTAINER

(71) Applicant: MDPULSE CO., LTD., Gumi-si (KR)

(72) Inventor: Jin Kuk Kim, Cheonan-si (KR)

(73) Assignee: MDPULSE CO., LTD. (KR)

( * ) Notice: Subject to any disclaimer, the term of this patent is extended or adjusted under 35 U.S.C. 154(b) by 114 days.

(21) Appl. No.: 15/046,847

(22) Filed: Feb. 18, 2016

(65) Prior Publication Data

US 2017/0205600 A1 Jul. 20, 2017

(30) Foreign Application Priority Data

Jan. 20, 2016 (KR) .................. 10-2016-0007261

(51) Int. Cl.
*G02B 7/08* (2006.01)
*G02B 7/02* (2006.01)
*H04N 5/225* (2006.01)

(52) U.S. Cl.
CPC ............... *G02B 7/08* (2013.01); *G02B 7/023* (2013.01); *H04N 5/2254* (2013.01)

(58) Field of Classification Search
CPC ............ G02B 7/02–7/10; G02B 27/64–27/648
See application file for complete search history.

(56) References Cited

U.S. PATENT DOCUMENTS

| | | | | |
|---|---|---|---|---|
| 7,589,920 B2 * | 9/2009 | Shin | ................ | G02B 7/102 359/811 |
| 7,595,947 B2 * | 9/2009 | Lee | ................ | G02B 7/021 310/323.01 |
| 7,706,089 B2 * | 4/2010 | Koc | ................ | G02B 7/021 359/819 |
| 8,086,099 B2 * | 12/2011 | Schworm | ................ | F16C 19/08 396/144 |
| 9,025,947 B1 * | 5/2015 | Teng | ................ | G02B 15/14 396/133 |
| 2009/0316284 A1 * | 12/2009 | Kim | ................ | G02B 7/102 359/824 |
| 2010/0091392 A1 * | 4/2010 | Jung | ................ | G02B 7/08 359/824 |
| 2013/0083235 A1 * | 4/2013 | Jacobsen | ................ | G03B 3/10 348/360 |

FOREIGN PATENT DOCUMENTS

| | | |
|---|---|---|
| KR | 10-2011-0031769 A | 3/2011 |
| KR | 10-2012-0032271 A | 4/2012 |
| KR | 10-2013-0059145 A | 6/2013 |

* cited by examiner

*Primary Examiner* — William R Alexander
*Assistant Examiner* — Jeffrey Madonna
(74) *Attorney, Agent, or Firm* — Kunzler, PC

(57) ABSTRACT

A camera module is provided, the camera module including a mover mounted with a lens, a stator movably supporting the mover to an optical axis direction of the lens, balls interposed at one side and the other side between the mover and the stator, a ball distance maintainer constantly keeping a distance between balls to a first direction, fixation means restricting a relative movement of the mover and the stator to a first direction, and permission means allowing a relative displacement of the mover and the stator to the first direction and restricting the relative displacement of the mover and the stator to a second direction.

10 Claims, 11 Drawing Sheets

CAMERA MODULE HAVING A BALL DISTANCE MAINTAINER

Pursuant to 35 U.S.C. § 119 (a), this application claims the benefit of earlier filing date and right of priority to Korean Patent Application No. 10-2016-0007261, filed on Jan. 20, 2016, the contents of which are hereby incorporated by reference in their entirety.

BACKGROUND OF THE DISCLOSURE

Field

The teachings in accordance with the exemplary embodiments of this present disclosure generally relate to a camera module having an auto focusing function.

Background

The recent market trend of mobile phone industries has changed in its aspect due to competitiveness of control technologies for realizing an accurate image quality while being increased in the number of pixels. A compact digital camera module differentiated to have a high resolution requires an auto focusing function in order to realize an accurate image quality despite being of small size.

Although the auto focusing function is already generalized in the conventional digital cameras, it is still difficult to realize the auto focusing function in a compact digital camera module miniaturized in terms of length/breadth size to within several mm. In order to realize the auto focusing function in a compactly miniaturized camera module, a renovating improvement in a driving mechanism including an actuator is required.

Furthermore, a low power consumption of auto focusing adjustment function is important in a small device using a power such as a battery. In addition, there is a need of preventing tilting moving to other directions than an optical axis direction due to mechanical problems when a lens is moved to an optical axis direction for auto focusing adjustment.

Korea registered patent publication No. 0649490 discloses a technology reducing power consumption in a latch method solenoid type actuator. However, the thing is that a measure to prevent a tilting phenomenon in the course of auto focusing is still insufficient.

CITED REFERENCE DOCUMENT

[Patent Document] Korea Registered Patent Publication No. 0649490

SUMMARY OF THE DISCLOSURE

The present disclosure is provided to a camera module configured to prevent a tilting phenomenon moving to other direction than an optical axis of a lens moving to an optical axis direction for auto focusing and to enable an easy manufacturing.

Technical subjects to be solved by the present disclosure are not restricted to the above-mentioned description, and any other technical problems not mentioned so far will be clearly appreciated from the following description by the skilled in the art.

In one general aspect of the present disclosure, there is provided a camera module, comprising:

a mover mounted with a lens;

a stator movably supporting the mover to an optical axis direction of the lens;

a first ball aligner aligned at one side of the mover to linearly travel along the optical axis direction;

a second aligner aligned at the other side of the mover to linearly travel along the optical axis direction; and a ball distance maintainer configured to constantly keep a ball center distance, which is a distance between a center of a ball belonging to the first ball maintainer and a center of a ball belonging to the second ball maintainer, to a first direction perpendicular to an optical axis.

The camera module may further comprise: fixation means configured to fix a relative position of the mover relative to the stator to a first direction perpendicular to the optical axis;

permission means configured to permit a relative displacement of the mover relative to the stator to the first direction, and to restrict the relative displacement of the mover relative to the stator to a second direction perpendicular to the first direction.

ADVANTAGEOUS EFFECTS

The camera module according to the present disclosure may include a mover mounted with a lens, and a stator movably supporting the mover to an optical axis direction of the lens. At this time, a first ball aligner and a second ball aligner straightly traveling along the optical axis direction may be interposed between the mover and the stator. A plurality of ball aligners where a ball roll-contacting the mover and the stator moves along the optical axis direction can prevent a slope tilt of horizontally tilting a lens when viewed from a lateral surface over a comparative exemplary embodiment where the mover is supported to the stator through a leaf spring.

When a ball is applied, the mover and the stator may relatively move to other direction than an optical axis of the lens. However, the mover and the stator can be induced to relatively move only to an optical axis direction by using a ball distance maintainer that constantly maintains a distance between a first ball aligner and a second ball aligner, and fixation means that restricts the first ball aligner or the second ball aligner.

Furthermore, permission means opposite to the first aligner or the second aligner and a suctioner pulling the mover toward the stator can additionally prevent the mover and the stator from relatively moving to other direction than the optical axis direction and can contribute to manufacturing a camera module easily and in a miniaturized size as well.

DETAILED DESCRIPTION OF THE DISCLOSURE

Exemplary embodiments of the present disclosure will be described in detail with reference to the accompanying drawings.

Features and advantages of the exemplary embodiments will be or will become apparent to one of ordinary skill in the art upon examination of the following figures and detailed description. In describing the present disclosure, certain layers, sizes, shapes, components or features may be exaggerated for clarity and convenience. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification. Furthermore, the term "when" may be construed to mean "if", depending on the context.

Figure 1:
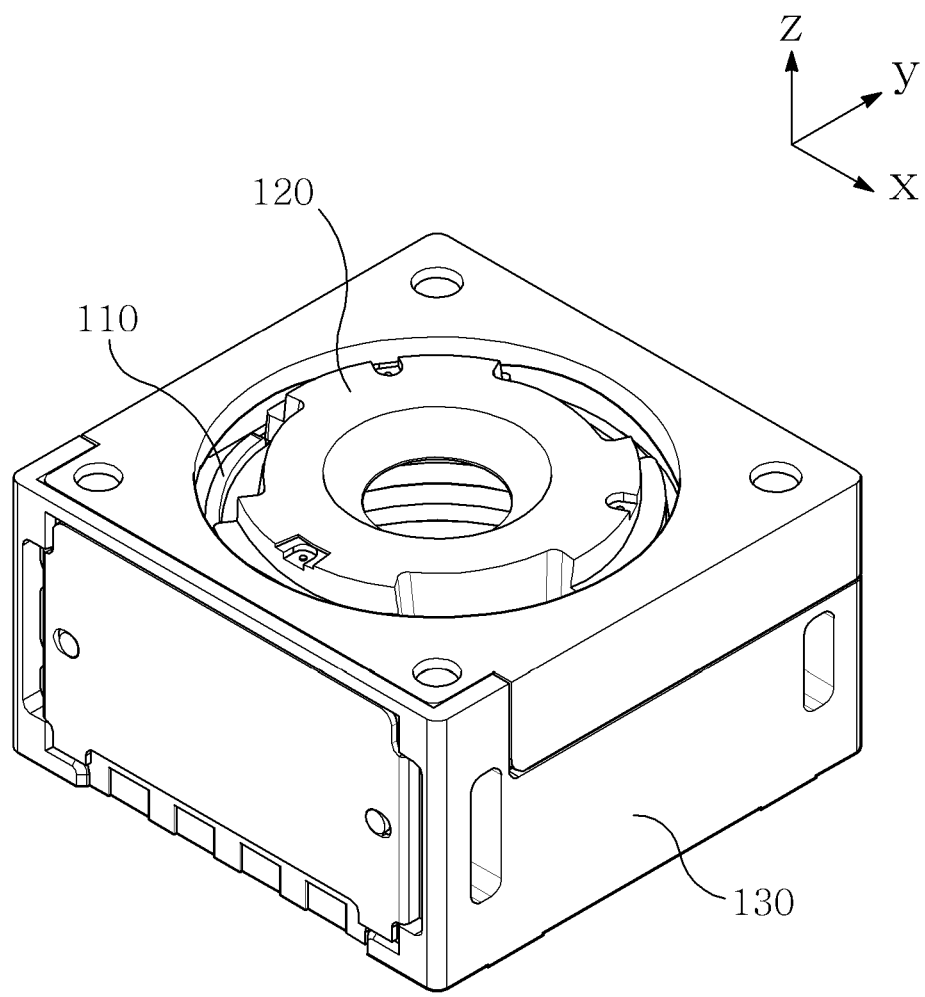
FIG. 1 is a schematic perspective view illustrating a camera module according to the present disclosure.
Figure 2:
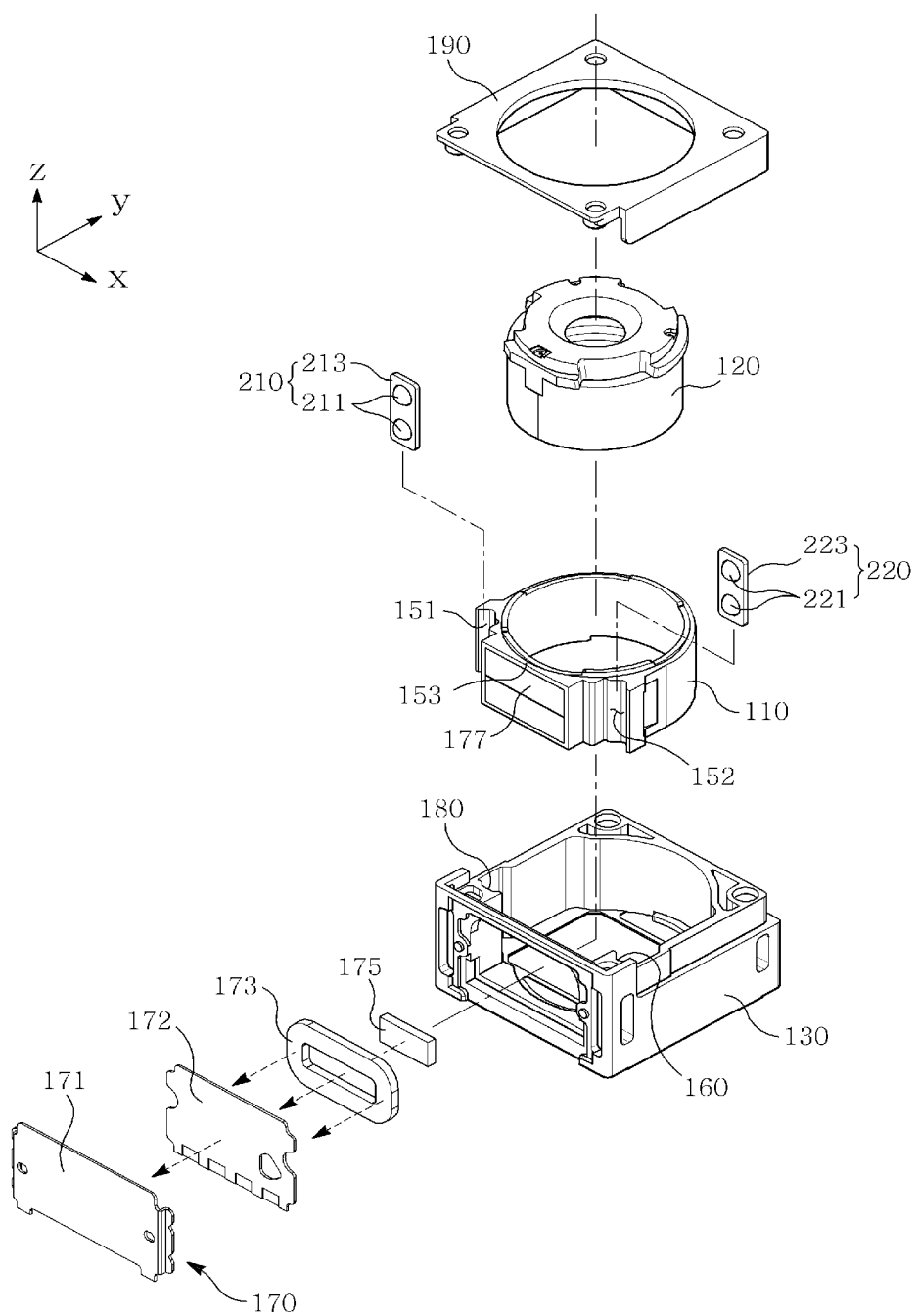
FIG. 2 is an exploded perspective view illustrating a camera module according to the present disclosure.

FIG. 1 is a schematic perspective view illustrating a camera module according to the present disclosure, and FIG. 2 is an exploded perspective view illustrating a camera module according to the present disclosure.

The illustrated camera module may include a moving part (hereinafter referred to as 'mover', 110), a stationary part (hereinafter referred to as 'stator', 130), a first ball aligner (210), a second ball aligner (220), a ball distance maintainer (150), fixation means (160), permission means (180) and a suctioner (170).

The mover (110) may be fixedly mounted with a lens (not shown). When the lens is installed inside a body tube (120), the mover (110) may be fixedly installed with the body tube (120). In the present disclosure, the term of optical axis means an imaginary axis on which an optical image incident from a subject to a camera module advances, and the optical axis is z axis as illustrated in the drawings.

The stator (130) may be covered by a cover (190) in order to prevent foreign objects from coming into a camera module. The mover (110) may be moved toward an optical axis during auto focusing by a coil (173) and a magnet (177). The stator (130) may movably support the mover (110) to an optical axis direction of the lens. Movable support of the mover (110) to an optical axis direction using other means than an elastic member is advantageous to tilting restriction and low power.

The camera module according to the present disclosure may use a first ball aligner (210) and a second ball aligner (220) in order to reduce power consumption for moving the mover (110) to the optical axis direction and to prevent an inclined tilt. The first ball aligner (210) and the second ball aligner (220) may include balls (211, 221) interposed between the mover (110) and the stator (130). The first ball aligner (210) may be aligned at one side of the mover (110). The first ball aligner (210) may linearly move along the optical axis direction when the mover (110) moves to the optical axis direction relative to the stator (130). The second ball aligner (220) may be aligned on the other side of the mover (110), and may linearly move along the optical axis direction like the first ball aligner (210).

The first ball aligner (210) and the second ball aligner (220) arranged on different positions on a horizontal direction perpendicular to the optical axis may restrict the degree of rotational freedom at the mover (110) using an optical axis as a rotation shaft.

A plurality of balls (221, 221) may be provided at each ball aligner at mutually different positions to an optical axis direction. According to the plurality of balls arranged at mutually different positions to an optical axis direction, and when an imaginary line perpendicular to the optical axis is imagined that crisscrosses the first ball aligner (210) and the second ball aligner (220), the degree of rotational freedom of the mover (110) using the imaginary line as a rotation shaft may be restricted.

In order to constantly maintain a distance between the plurality of balls (211 arranged on the first ball aligner (210), the ball aligner may be provided with a first ball retainer (213) configured to constantly maintain a distance between each first ball (211). A second ball retainer (223) may be provided at the second ball aligner (220) in order to constantly keep a distance between each second ball (221).

According to a relative moving method by the mover (110) and the stator (130) to the optical axis direction through the balls arranged between the mover (110) and the stator (130) and through the rolling contact of the balls, no elastic force of elastic members is applied to dispense with a power necessary for coping with a relevant elastic force, whereby power consumption can be reduced. Furthermore, it is easy to control the position of mover (110) because the mover (110) can be moved by an equal power regardless of position of the mover (110). However, means to restrict the degree of freedom at balls must be added in comparison with a method using an elastic member in light of characteristics of balls having many degrees of freedom.

Figure 3:
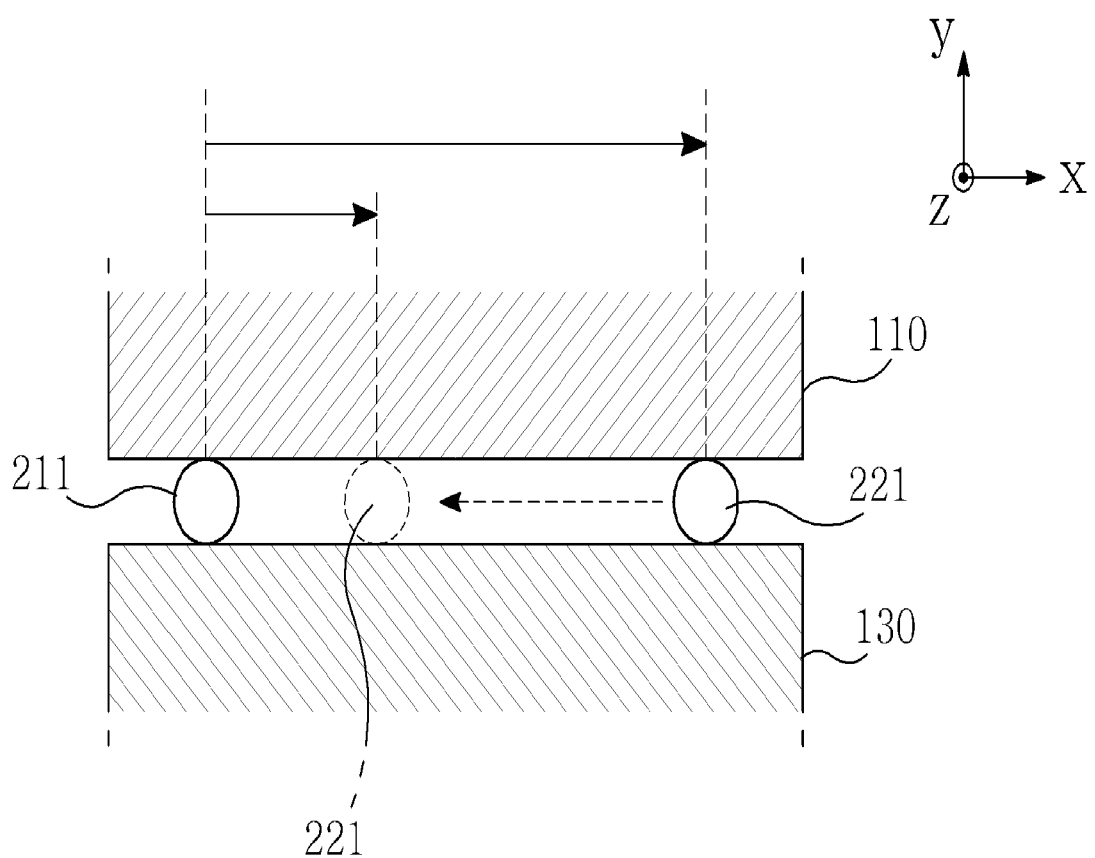
FIG. 3 is a conceptual view illustrating a ball type camera module.

FIG. 3 is a conceptual view illustrating a ball type camera module.

A method of arranging balls (211, 221) between the mover (110) and the stator (130) for auto focusing may be generated with the following disadvantages.

For example, as illustrated in FIG. 3, when the second ball (221) moves toward the first ball (211) while the mover (110) moves to the optical axis direction, a support point between the mover (110) and the stator (130) is leant to one side, whereby a rotational tilt of the mover (110) inclining to the first ball (211) side may be randomly generated. Meantime, the mover (110) and the stator (130) may be mutually detached.

Meantime, referring again to FIG. 3, the first ball (211) provided at the first ball aligner (210) and the second ball (211) provided at the second ball aligner (220) may be arranged at mutually different positions along a first direction (x axis direction) perpendicular to the optical axis. At this time, when there is no means to fix the positions of the mover (110) and the stator (130) to a second direction (y axis direction) perpendicular to the optical axis and perpendicular to the first direction, the mover (110) and the stator (130) may be mutually distanced along the y axis direction. In order to improve the disadvantages of ball type method, a comparative exemplary embodiment as illustrated in FIG. 11 may be considered.

Figure 11:
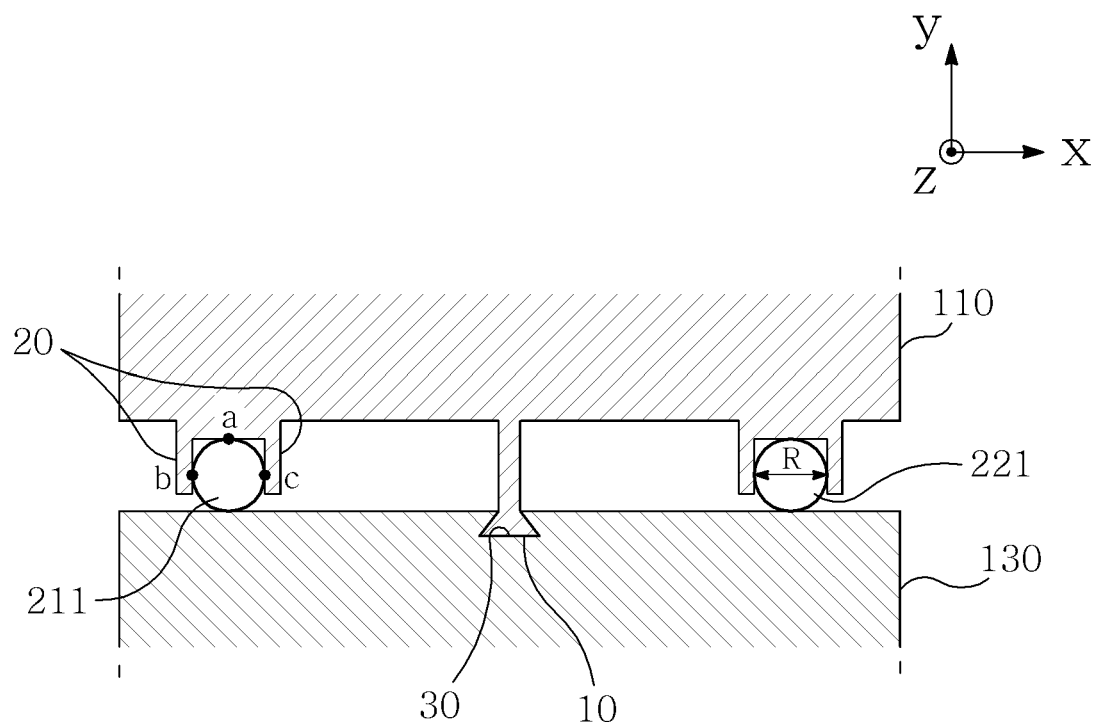
FIG. 11 is a schematic view illustrating a comparative exemplary embodiment of the present disclosure.

FIG. 11 is a schematic view illustrating a comparative exemplary embodiment of the present disclosure. However, the comparative exemplary embodiment of the present disclosure is fraught with fatal disadvantages.

First of all, a wedge-shaped protruder (10) and an inserter (30) are increased in terms of friction or interference between contacted areas while being surface-contacted. Thus, the meaning of interposing a ball between the mover (110) and the stator (130) is lost. Furthermore, it is difficult to accurately manufacture a protruded length of the protrude (10) on a constant base. Thus, when a gap between the mover (110) and the stator (130) is very minutely larger than a designed value, a gap the size of a ball to free-fall therethroughh may be formed. Conversely, when a gap between the mover (110) and the stator (130) is very minutely smaller than a designed value, the ball may be tightly squeezed between the mover (110) and the stator (130) to restrict the relative movement of the mover (110) and the stator (130).

Furthermore, the friction or interference between contacted areas may be increased because the ball three-point contacts a floor a, and both lateral walls b, c of an accommodation unit (20) due to cross-sectionally square groove-shaped accommodation unit (20). In addition, there is another difficult problem in forming a distance between lateral walls b, c of the accommodation unit (20) in the same size as a diameter R of the ball. Thus, when the distance b, c is greater than the diameter R, there is still another problem of the ball moving freely between the b and c. Conversely, when the distance b, c is smaller than the diameter R, there is still another problem of the ball being tightly squeezed in the accommodation unit (20). Resultantly, in case of the comparative exemplary embodiment of FIG. 11 having the square groove-shaped accommodation unit (20), the protrude (10) and the inserter (30), there is no way of effectively taking advantage of the ball being interposed between the mover (110) and the stator (130).

FIGS. 4 to 7 explain the problems of the foregoing-discussed ball type method and concepts gradually improving the problems possessed by the comparative exemplary embodiment.

Figure 4:
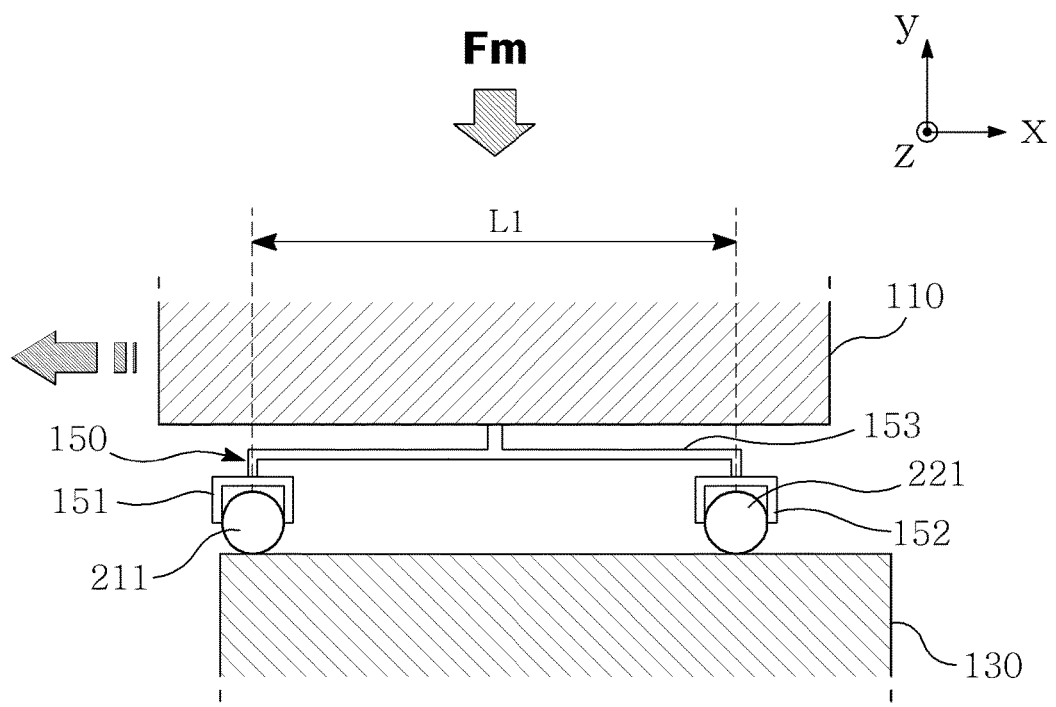
FIG. 4 is a conceptual view illustrating a camera module applied with a ball distance maintainer.

To begin with, in order to solve the problems of the first ball (211) and the second ball (211) arranged on mutually different positions to a horizontal direction being mutually closed and distanced, the camera module according to the present disclosure may include a ball distance maintainer (150). FIG. 4 is a conceptual view illustrating a camera module applied with a ball distance maintainer (150).

The ball distance maintainer (150) can constantly keep a ball center distance, which is a distance between a center of a first ball (211) belonging to a first ball maintainer (210) and a center of a second ball (221) belonging to a second ball maintainer (220).

If insinuatingly explained using an automobile, the ball distance maintainer (150) may correspond to means to constantly maintain a wheelbase corresponding to a distance between a front wheel and a rear wheel. The ball distance maintainer (150) is configured in a manner such that a ball center distance between the first ball (211) and the second ball (221) arranged at mutually different positions to a first direction (x axis direction) can be constantly maintained, Thus, the problem of the distance between the first ball (211) and the second ball (221) being nearer or distanced can be solved.

In addition, the camera module according to the present disclosure may be provided with a suctioner (170) configured to absorb the mover (110) into the stator (130) along a second direction (y axis direction). According to the suction force Fm of the suctioner (170), the mover (110) and the stator (130) can be mutually and tightly abutted to prevent the mover (110) from being distanced from the stator (130).

However, although the mover (110) and the stator (130) cannot be physically tightly contacted due to a ball aligner interposed between the mover (110) and the stator (130), the mover (110) and the stator (130) can maintain a predetermined constant gap to the second direction. However, the problem of relative movement of the mover (110) and the stator (130) to the first direction still remains unsolved when only the ball distance maintainer (150) and the suctioner (170) are provided.

Figure 5:
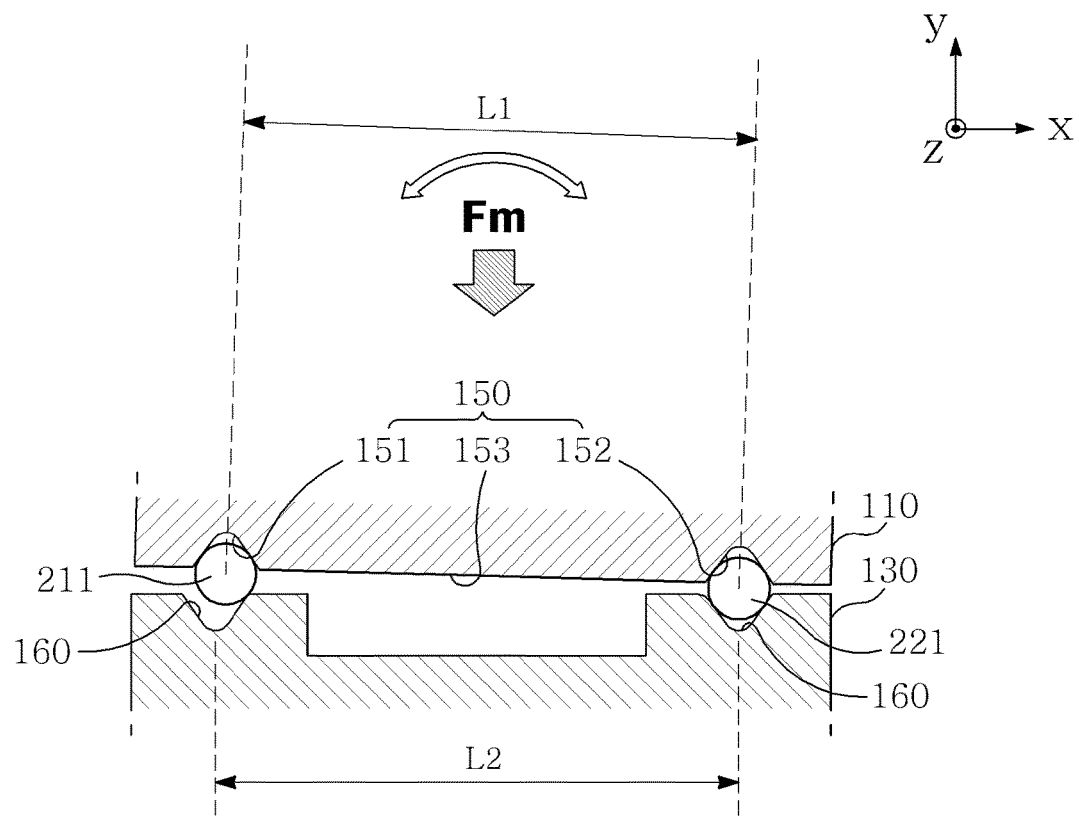
FIG. 5 is a conceptual view illustrating a camera module applied with two fixation means.

FIG. 5 is a conceptual view illustrating a camera module applied with two fixation means (160). The fixation means (160) may fix a relative position of the mover (110) relative to the stator (130) to the first direction perpendicular to the optical axis of the lens. At this time, the first direction may conform to an extended direction of an imaginary line crisscrossing the first ball aligner (210) arranged at one side of the mover (110) and the second ball aligner (220) arranged at the other side of the mover (110).

The fixation means (160) may be a groove formed on a surface opposite to the balls (211, 221) on the mover (110) or a surface opposite to the balls (211, 221) on the stator (130). The relevant groove may be formed to allow a part of balls (211, 221) to be accommodated thereinto. When the ball distance maintainer (150) is fixed to the mover (110) and the fixation means (160) is formed on the stator (130), the ball mounted on the ball distance maintainer (150) may be hitched by the fixation means (160) and cannot be moved to the first direction. Thus, the mover (110) fixed to the ball to the first direction through the ball distance maintainer (150) cannot move to the first direction relative to the stator (130), either. Thus, the problem can be solved by the fixation means (160).

Therefore, the foregoing ball distance maintainer (150) and the fixation means (160) can solve all the problems possessed by the method of supporting the mover (110) and the stator (130) to allow being relatively moved to the optical axis direction using the balls. Furthermore, the present disclosure can rule out the protruder (10) and the inserter (30) shown in the comparative exemplary embodiment according to FIG. 11, whereby the problem of the comparative exemplary embodiment of FIG. 11 can be also solved.

Meantime, when one fixation means (160) is formed on a position opposite to the first ball (211) and another fixation means (160) is formed on a position opposite to the second ball (221) as shown in FIG. 5, a new problem may be induced.

A ball center distance L1 between the first ball (211) and the second ball (221) may be constantly maintained by the ball distance maintainer (150). At this time, the a distance between the fixation means (160) opposite to the first ball (211) and the fixation means (160) opposite to the second ball (221) may be formed as L2.

When L1 and L2 are same, there is no problem of respectively providing one fixation means (160) on the first ball (211) side and another fixation means (160) on the second ball (221) side. However, it is difficult in reality during an actual manufacturing process to make same the distances L2 and L1 between the two fixation means (160) separately formed from the ball distance maintainer (150).

Thus, when the distance L2 between two fixation means (160) is greater than the ball center distance L1, one of the first ball (211) and the second ball (221) may be accurately accommodated into the fixation means (160), but remaining one ball may not be completely accommodated and may be positioned by being lifted.

For example, when the suction force Fm of the suctioner (170) is lopsidedly acted on the second ball (221) side, the second ball (221) may be completely accommodated into the fixation means (160). On the other hand, the first ball (211) cannot be completely accommodated into the fixation means (160) and may be lifted toward the mover (110), whereby the mover (110) may be in a state of being rotated to right side using the optical axis as the rotation shaft.

When the suction force Fm of the suctioner (170) is lopsidedly acted on the first ball (211) side during auto focusing operation, the first ball (211) can be completely accommodated into the fixation means (160), whereas the second ball (221) may be lifted upwards, whereby the mover (110) may be in a state of being rotated to left side using the optical axis as the rotation shaft. Thus, there is a need to address the rotational tilt induced by the difference between L1 and L2.

Figure 6:
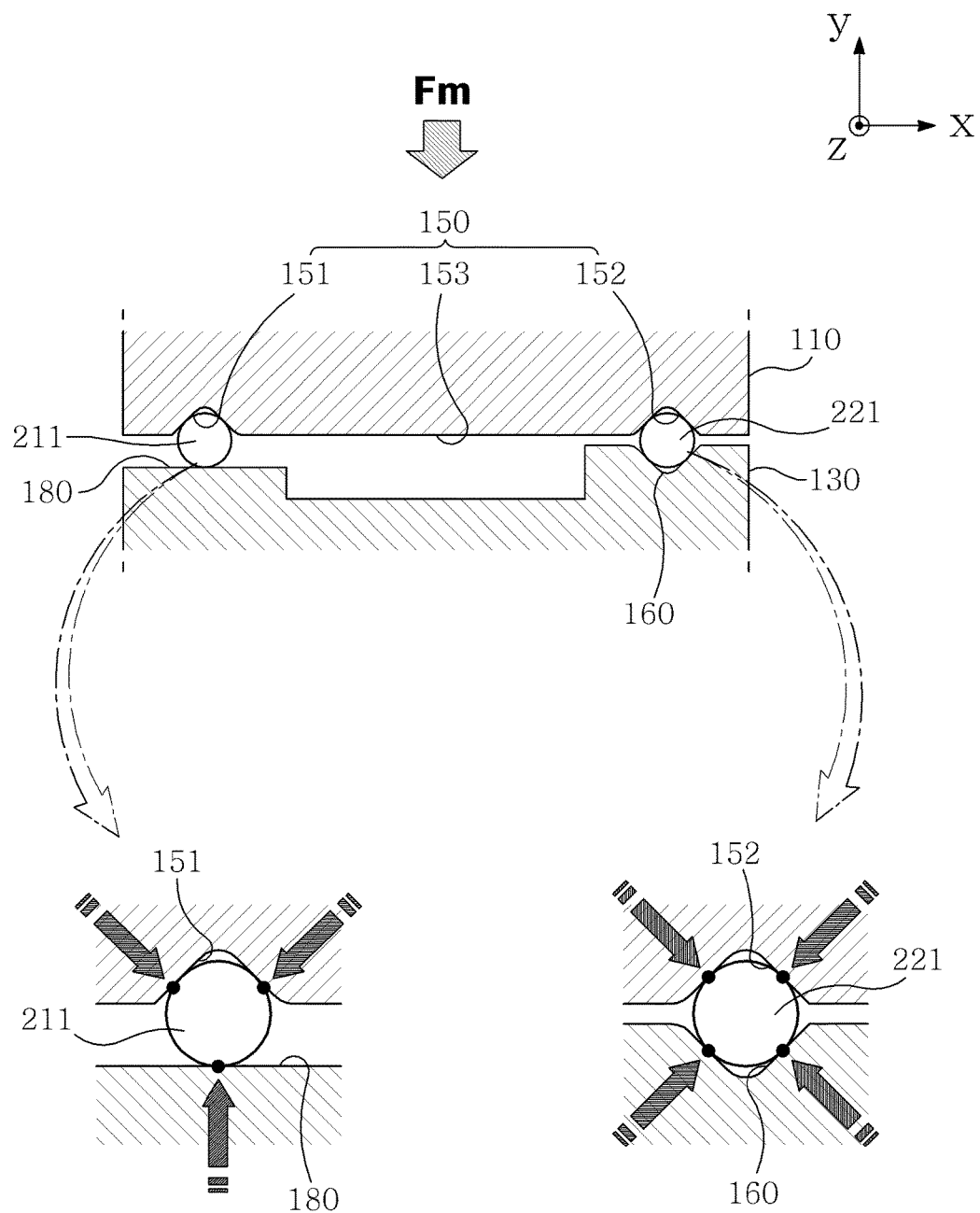
FIG. 6 is a schematic view illustrating a camera module according to an exemplary embodiment of the present disclosure.

FIG. 6 is a schematic view illustrating a camera module according to a first exemplary embodiment of the present disclosure, and can solve the abovementioned problems. The camera module illustrated in FIG. 6 may use permission means (180) in order to address the tilting problem induced by the difference between the ball center distance L1 and a distance L2 between fixation means. The permission means (180) may replace one of two fixation means (160), and may freely allow a relative displacement of the mover (110) relative to the stator (130) to the first direction (x axis direction). At the same time, the permission means (180) may be so formed as to restrict a relative displacement of the mover (110) relative to the stator (130) to the second direction (y axis direction) perpendicular to the first direction (x axis direction).

When the relative displacement of the mover (110) relative to the stator (130) to the first direction, the permission means (180) may be point-contacted to the ball less than two points. Furthermore, the permission means (180) may be extended to the first direction perpendicular to the second direction in order to restrict the relative displacement of the mover (110) relative to the stator (130) to the second direction.

In order to satisfy the above two conditions, the permission means (180) may include a plan surface one point-contacted to the first ball (211) or to the second ball (221) and parallel to the first direction. When one of the first ball (211) and the second ball (221) mounted on the ball distance maintainer (150) two point-contacts the fixation means (160), the remaining one may be one point-contacted to the permission means (180).

The permission means (180) is configured in a manner such that L2 possessed by the two fixation means (160) fixing the position of the ball to the first direction disappear, and therefore no problem caused by difference between L1 and L2 is induced. In other words, even if the suction force Fm is lopsidedly acted on one of the first ball (211) and the second ball (221), the phenomenon of the remaining ball being lifted can be prevented and therefore no rotational tilt is induced.

The ball distance maintainer (150) can constantly maintain the ball center distance L1. The fixation means (160) may restrict only any one of the first ball aligner (210) and the second ball (211) to the first direction. The permission means (180) may face only the other remaining one of the first ball aligner (210) and the second ball (211). According to the camera module provided with the ball distance maintainer (150), restriction means and permission means (180), the problems possessed by the ball type method can be all solved. Furthermore, the problem possessed by the comparative exemplary embodiment can be also solved because the inserter (30) and the protrude (10) of the comparative exemplary embodiment of FIG. 11 can be omitted. As a result, the mover (110) and the stator (130) can be relatively moved without fail to the optical axis direction using only point-contact with each ball aligner interposed between the mover (110) and the stator (130).

Although the foregoing explanation has described an exemplary embodiment in which the ball distance maintainer (150) is formed on the mover (110), and the fixation means (160) and the permission means (180) is formed on the stator (130), it is also possible to implement an exemplary embodiment where the ball distance maintainer (150) is formed on the stator (130), and the fixation means (160) and the permission means (180) is formed on the mover (110). It is advantageous when a contact portion or a contact area between the mover (110)/stator (130) and the ball is smaller in order for the mover (110) to move to the optical axis direction relative to the stator (130) without any particular interference or resistance. The permission means (180) having a plan surface parallel to the second direction may be one-point contacted to the first ball (211) or the second ball (221). On the other hands, the fixation means (160) may have a varying contact area with the ball depending on the shape.

Figure 7:
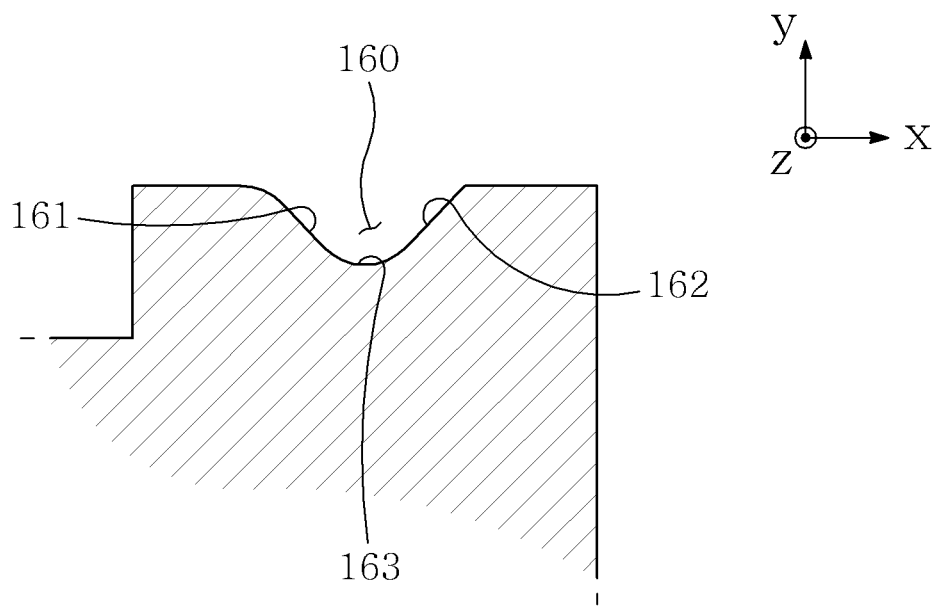
FIG. 7 is a schematic view illustrating fixation means forming a camera module according to the present disclosure.

FIG. 7 is a schematic view illustrating fixation means (160) forming a camera module according to the present disclosure. The fixation means (160) may be extended to the optical axis direction and may be formed with a rail to move the ball. At this time, the fixation means (160) may be formed on a surface that faces the stator (130) at the mover (110) and that is parallel to the first direction. Alternatively, the fixation means (160) may be formed on a surface that faces the mover (110) at the stator (130) and that is parallel to the first direction.

The fixation means (160) may include a groove extended along the optical axis direction and accommodated by a part of the ball. In order to address the problem of the mover (110) moving to the first direction relative to the stator (130), the fixation means (160) may be so configured as to contact at least two points of the ball. In addition, the fixation means (160) may be so formed as to prevent the phenomenon of the mover (110) moving to the second direction using at least the two point contact with the ball like the permission means (180).

For example, the groove provided on the fixation means (160) may be so formed as to contact the ball on two points. At this time, in order to solve the tilting problem using only the two point contact, a relevant groove may be provided with a first slope (161) and a second slope (162) respectively inclined to the first direction and the second direction. The first slope (161) may one point-contact at one side of the ball, a part of which is accommodated into the groove by the suction force Fm of the suctioner (170), and the second slope (162) may one point-contact at the other side of the ball, a part of which is accommodated into the groove by the suction force Fm of the suctioner (170).

The first slope (161) and the second slope (162) may be formed by a gap simultaneously contacted by the balls. The first slope (161) and the second slope (162) formed by a gap simultaneously contacted by the balls may form a 'V' shaped groove extended to the optical axis direction. The fixation means (160) formed by the 'V' shaped groove may two point-contact a ball partially accommodated into the 'V' shaped groove out of two balls installed at one side and the other side of the ball distance maintainer (150). The ball may be restricted in movement to one side of the first direction, for example, to the left side (negative direction of x axis), by the suction force Fm of the suctioner (170) and the contact with the first slope (161).

At this time, F2, force applied to the first slope (161) is a composite vector of a force applied to the left in FIG. 7 and a force applied downward, such that the ball is prevented from moving to the left side and to the downward. Furthermore, the ball may be restricted in movement to the other side of the first direction, for example, to the right side (positive direction of x axis), by the suction force Fm of the suctioner (170) and the contact with the second slope (162). At this time, F1, force applied to the second slope (162) is a composite vector of a force applied to the right and a force applied downward, such that the ball is prevented from moving to the right side and to the downward.

The mover (110) and the stator (130) may be fixed in relative positions to the first direction, because the mover (110) or the ball fixed to the stator (130) to the first direction by the ball distance maintainer (150) is restricted in movement to the first direction by the fixation means (160). In addition, because the position of the mover (110) to the second direction can be constantly maintained by only two point contact, elements interfering the ball rolling can be reduced compared with the accommodation unit (20) in the comparative exemplary embodiment of FIG. 11.

Furthermore, according to the 'V' shaped groove, the ball always maintains a state of being contacted to the first and second slopes (161, 162) under an environment where the suction force Fm is applied, such that the ball is prevented from moving along the first direction within the fixation means (160). Furthermore, in view of the fact that the two point-contact between the ball and the fixation means (160) is not realized by force, but naturally realized by the suction force Fm, the phenomenon of the ball being tightly squeezed to the fixation means (160) can be also prevented.

It is preferable that a connection area (163) between the first slope (161) one point-contacting an area at one side of the ball and the second slope (162) one point-contacting the other side of the ball be formed with a curved surface. When an apical spot of the groove, which is the connection area (163) between the first slope (161) and the second slope (162) is formed with a curved surface, the phenomenon of foreign objects being introduced into the connection area (163) can be avoided. When the mover (110) provided with the fixation means (160) or when the stator (130) is injection molded from a mold, the mover (110) or the stator (130) may be easily detached from the mold because of the curvedly surfaced connection area (163). Alternatively, when the mover (110) or the stator (130) is injection molded from a mold, the generation of burrs on the connection area (163) can be restricted.

Returning to FIG. 6, the permission means (180) arranged at a position different from that of the fixation means (160) may be a plan surface parallel to the first direction perpendicular to the suction force Fm. Thus, the force Fa applied to the permission means (180) may react to the second direction which is same as that of the suction force Fm, and may constantly maintain the position of the mover (110) to the second direction. The permission means (180) may be a surface opposite to the stator (130) about the ball, but may be a surface opposite to the mover (110) about the ball at the stator (130). The ball distance maintainer (150) may be arranged at an area opposite to the permission means (180) or the fixation means (160) on the mover (110) or the stator (130) across the ball. The ball distance maintainer (150) may include a 'V' shaped groove formed at any one side of the mover (110) and the stator (130).

Figure 8:
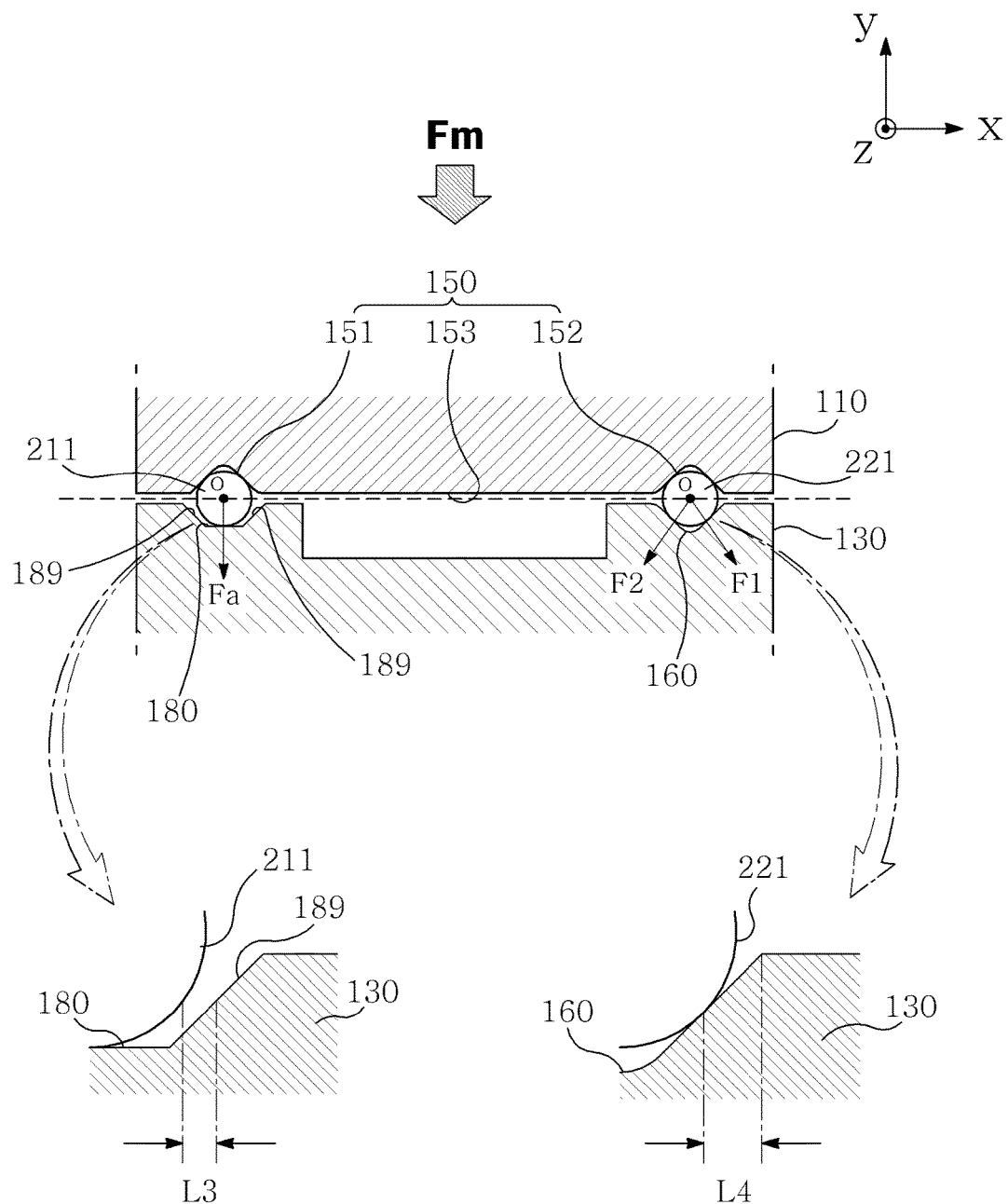
FIG. 8 is a schematic view illustrating a camera module according to another exemplary embodiment of the present disclosure.

FIG. 8 is a schematic view illustrating a camera module according to another exemplary embodiment of the present disclosure.

When an external shock greater than the suction force Fm of the suctioner (170) is applied, the ball of the fixation means (160) or the permission means (180) may not be point-contacted to be detached or to deviate from an installed position. In order to address the problem, the permission means (180) may be provided at both sides with a stopper slope (189) protruded from the permission means (180), lest the ball supported to the permission means (180) be deviated from the installed position. The ball supported to the permission means (180) normally maintains a state of being one point contacted to the permission means (180) at a first position to the first direction, and when the ball is moved by the external shock to a positive direction of the first direction or to the reverse direction, the ball may collide with the stopper slope (189) at a second position to the first direction. The ball that has collided with the stopper slope (189) may deviate from an allowable scope and may be restricted in movement.

The stopper slope (189) may be two slopes formed in the 'V' shaped groove across the permission means (180) in order to prevent the ball from moving beyond the allowable scope. According to the stopper slope (189) slantly formed to allow the ball moving to the first direction to ride over, the external shocks transmitted to the stator (130), the mover (110) and the lens through the ball can be mitigated. The stopper slope (189) may be connected to the mover (110) or to the stator (130), or connected to the lens through the mover (110), such that the shocks applied to the stopper slope (189) may be transmitted to the mover (110), to the stator (130) and to the lens. Meantime, because the shocks applied to the ball are mitigated while riding over the stopper slope (189), the mitigated shocks may be applied to the mover (110), to the stator (130) and to the lens.

However, there may be a problem of the ball moving beyond the allowable scope to the first direction due to the stopper slope (189) formed in a structure that allows the ball to ride thereover. The stopper slope (189) may be formed in consideration of the fixation means (160) in order to prevent the ball from moving beyond the allowable scope. Now, it is defined that a distance to an entrance from a point contacted by the ball at the fixation means (160) to the first direction is L4, and that a distance necessary for the ball contacted by the permission means (180) to the first direction to contact the stopper slope (189) is L3. At this time, the fixation means (160) and the stopper slope (189) may be such that L4 is formed greater than L3. When the mover (110) is to be moved to the first direction by the external shocks, the ball, for example, the second ball (221), supported to the fixation means (160) must be first lifted from the fixation means (160).

The suction force Fm applied to the second direction reacts as a first resistance or a damper on the second ball (221) lifted from the fixation means (160), such that the second ball cannot be easily lifted from the fixation means (160) and the shock can be naturally mitigated in the course of being lifted.

In addition, because of L4 being formed greater than L3, the first ball (211) supported to the permission means (180) at the first position corresponding to an initial position before the second ball (221) is completely deviated from the fixation means (160) may move to the second position to contact the stopper slope (189). Because the contact shock between the first ball (211) and the stopper slope (189) is in a state of being mitigated through the process of the second ball (221) being lifted from the fixation means (160), the contact shock may be so induced as not to give a serious influence on the mover (110), the stator (130) and the lens.

Furthermore, because the first ball (211) rides over the stopper slope (189) in the midst of the second ball (221) riding over the first slope (161) or the second slope (162) of the fixation means (160), the suction force of Fm applied to the second direction may react as a second resistance or a damper to the first ball (211). Thus, the mover (110) trying to escape from the stator (130) along the first direction may be applied with the first resistance along with the second resistance. The external shock may be further mitigated by the second resistance newly added to the first resistance, such that each ball may be resultantly returned to an initial position while not being completely escaped from the fixation means (160) and the stopper slope (189).

Now, the process of each ball being returned to an initial position by the suction force Fm will be discussed. The second ball (221) may descend over the slope of the fixation means (160), and the first ball (211) may descend over the stopper slope (189), such that the shock induced from the returning process may be also mitigated.

Figure 9:
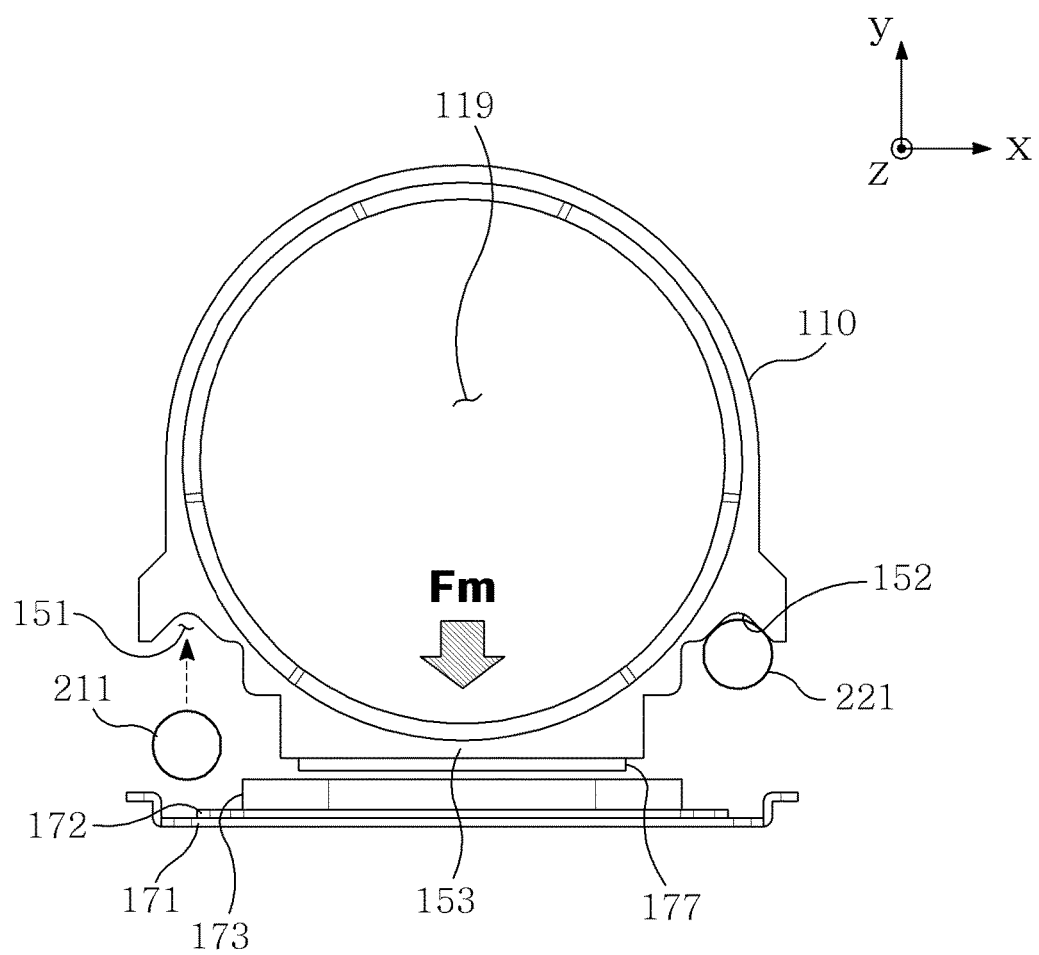
FIG. 9 is a plan view illustrating some of elements in a camera module according to the present disclosure.

FIG. 9 is a plan view illustrating some of elements in a camera module according to the present disclosure.

The fixation means (160) and the permission means (180) may be formed along with the mover (110), or may be formed along with the stator (130). At this time, the first and second balls (211, 221) may be interposed between the mover (110) and the stator (130). The first ball (211) and the second ball (221) whose ball center distance is constantly maintained by the ball distance maintainer (150) may maintain the state of being contacted to the fixation means (160) or to the permission means (180) by the suction force Fm of the suctioner (170).

The suctioner (170) may be provided with a magnet (177) mounted on the mover (110) and a yoke (171) mounted on the stator (130) and applied with an attractive force of the magnet (177). A surface of the yoke (171) opposite to the magnet (177) may be provided with a substrate (172) and a coil (173). The substrate (172) may be applied with an electric signal received from a body of a terminal mounted with an image sensor. When the yoke (171) is a plate extended to the optical axis direction and the first direction, the substrate (172) may be mounted on a surface of the yoke (171) opposite to the magnet (177). The coil (173) may be mounted on a surface of the substrate (172) opposite to the magnet (177). The coil (173) may generate a magnetic force interacting with the magnet (177) in response to the electric signal applied to the substrate (172), and may move the mover (110) to the optical axis direction according to the magnetic force. A Hall sensor (175) configured to detect the displacement of the magnet (177) may be provided to the optical axis direction at a central space of the coil (173) wound with a ring-shaped electric conductor communicated with an electric signal.

A central area of the coil (173) is where the magnetic force generated from the coil (173) is offset, such that the Hall sensor (175) arranged at the central area of the coil (173) can be applied only with the magnetic force of the magnet (177). The Hall sensor (175) may be used to detect changes in magnetic force of the magnet (177) and to grasp the positions of optical axis directions of the mover (110) and the lens moving along with the magnet (177).

The yoke (171) may be used to prevent the magnetic force formed at the coil (173) from being leaked out to the outside and used as support means of the substrate (172) and the coil (173) as well. Furthermore, the yoke (171) may include a magnetic substance acted with the attractive force of the magnet (177). The attractive force of the magnet (177) pulling the yoke (171) may act as the suction force Fm that sucks the mover (110) fixed with the magnet (177) relative to the stator (130) fixed with the yoke (171). The ball distance maintainer (150) may be integrally with the mover (110) or the stator (130). For example, FIG. 9 illustrates the mover (110) formed with the ball distance maintainer (150). The ball distance maintainer (150) may be provided with a first installer (151), a second installer (152) and a connector (153).

The first installer (151) may be mounted with the first ball aligner (210). The second installer (152) may be mounted with the second ball aligner (220), and the connector (153) may connect the first installer (151) and the second installer (152) to constantly maintain a gap between the first installer (151) and the second installer (152), wherein the first installer (151) and the second installer (152) may be formed on any one of the mover (110) and the stator (130). The remaining one out of the mover (110) and the stator (130) may be formed with the permission means (180) opposite to the first installer (151) and the fixation means (160) opposite to the second installer (152).

The first installer (151) and the second installer (152) may be a 'V' shaped groove like the fixation means (160). Preferably, the first installer (151) and the second installer (152) may be formed in the same way as the fixation means (160). To be more specific, the first installer (151) and the second installer (152) may include two slopes two point-contacted by the ball and may be linearly extended along the optical axis direction like the fixation means (160). Furthermore, a curve-shaped connection area may be provided between two slopes at each installer.

Figure 10:
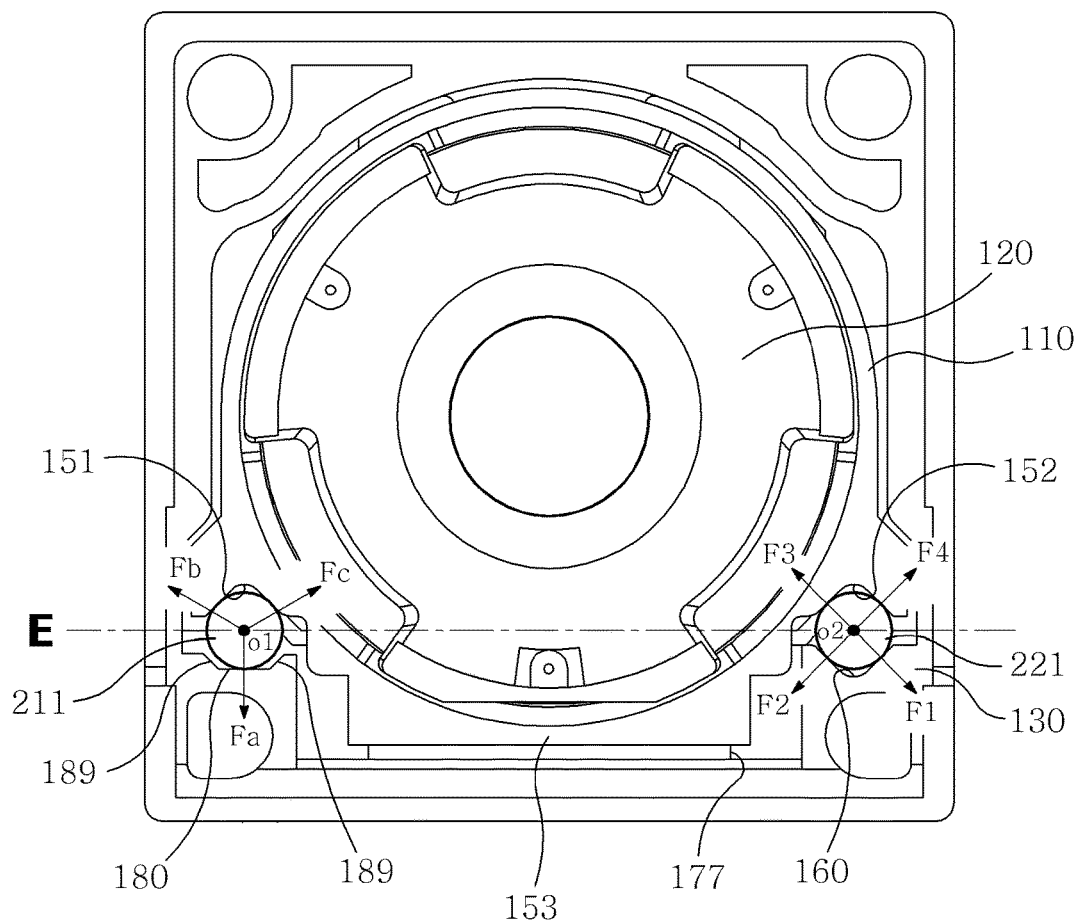
FIG. 10 is a plan view illustrating a camera module according to the present disclosure.

FIG. 10 is a plan view illustrating a camera module according to the present disclosure, where FIG. 10 may illustrates a state where a cover (190) covering the stator (130) is ruled out. The ball distance maintainer (150) formed with the 'V' shape groove and the fixation means (160) may be extended to the optical axis direction, and may face each other across a ball. The ball distance maintainer (150) or the fixation means (160) may be formed on a surface opposite to the stator (130) at the mover (110), or on a surface opposite to the mover (110) at the stator (130). The permission means (180) may also be formed opposite to the ball distance maintainer (150) across a ball.

The first ball (211) and the second ball (221) are preferably arranged on an imaginary linear line E parallel to an extended direction of the suctioner (170) to allow the suction force Fm of the suctioner (170) to be equally applied to a side aligned with the first ball (211) at the mover (110) and to a side aligned with the second ball (221). To this end, the fixation means (160) and the permission means (180) may be respectively provided at one side and the other side of the suctioner (170). Furthermore, the fixation means (160) and the permission means (180) may position a ball contacted to the fixation means (160) and a ball contacted to the permission means (180) on the imaginary linear line E.

In addition, when the stator (130) is formed in a square pillar shape, the suctioner (170) may form a surface of one side of the stator (130). Thus, one side and the other side of the suctioner (170) may correspond to a clearance (spatial room) not interfering with the mover (110) formed in a pillar shape in order to support the lens. Thus, the fixation means (160), the permission means (180), the first installer (151) and the second installer (152) may be easily formed in the clearance.

The imaginary linear line E is preferably arranged nearer to the optical axis than the yoke (171) forming the suctioner (170) and the magnet (177) in order to allow the permission means (180) and the first installer (151), and the fixation means (160) and the second installer (152) to be securely contacted across a ball by the suction force Fm. The ball distance maintainer (150), the fixation means (160) and the permission means (180) may be arranged nearer to the optical axis of the lens than the suctioner (170) to the first direction in order to allow the ball to be arranged nearer to the optical axis than the suctioner (170).

Mutually facing two out of the ball distance maintainer (150), the fixation means (160) and the permission means (180) across the ball may form a ball-traveling rail that is extended to the optical axis direction.

At this time, a pressure vector may be defined that applies and contacts the ball to the rail in response to the suction force Fm of the suctioner (170). The pressure vector may be divided into a slope pressure vector acting to a direction inclined to the first direction (x axis direction) and the second direction (y axis direction), and a vertical pressure vector acting to the second direction (y axis direction).

At this time, the ball-traveling one side rail, for example, a rail formed with respectively facing second installer (152) and the fixation means (160), may be acted with mutually different direction-facing four (4) slope pressure vectors (F1, F2, F3, F4). The ball-traveling other side rail, for example, a rail formed with the first installer (151) and the permission means (180), may be acted with mutually different direction-facing two (2) slope pressure vectors (Fb, Fc) and one vertical pressure vector Fa. At this time, the F1 and F2 are forces applied to the fixation means (160) and can prevent the second ball (221) from moving to the first direction. F3 and F4 are forces applied to the second installer (152) and can prevent the second ball (221) from moving to the first direction. Fb and Fc are forces applied to the first installer (151) and can prevent the first ball (211) from moving to the first direction.

The ball center distance between the first ball (151) and the second ball (152) can be constantly maintained, because the first ball (211) is prevented from moving to the first direction by the first installer (151), and the second ball (221) is prevented from moving to the first direction by the second installer (152). Furthermore, the ball is prevented from moving to the second direction by the vectors F1, F2, F3, F4, Fa, Fb and Fc and the suction force Fm. Thus, according to the vectors F1, F2, F3, F4, Fa, Fb and Fc and the suction force Fm, all the problems posed by the first problem, second problem and the third problem and the comparative exemplary embodiment of FIG. 11 can be solved.

Now, a center 02 of the second ball (221) aligned at one side of the mover (110) is defined as a starting point (square one), and a first coordinate axis having an imaginary axis extended to the first direction and an imaginary axis extended to the second direction is defined. At this time, the second ball (221) aligned at one side of the mover (110) may contact four points each distributed to a first quadrant, a second quadrant, a third quadrant and a fourth quadrant of the first coordinate axis.

Now, a center 01 of the first ball (211) aligned at the other side of the mover (110) is defined as a starting point (square one), and a second coordinate axis having an imaginary axis extended to the first direction and an imaginary axis extended to the second direction is defined. At this time, the first ball (211) aligned at the other side of the mover (110) may contact two points each distributed to a first quadrant and a second quadrant of the second coordinate axis, and contact one point distributed to a center of a third quadrant and a fourth quadrant of the second coordinate axis.

Although the camera module has been described and explained according to exemplary embodiments, the present disclosure is not limited to a particular exemplary embodiment but many alternatives, modifications, and variations will be apparent to those skilled in the art within the metes and bounds of the claims.

Therefore, it should be understood that the above-described embodiments are not limited by any of the details of the foregoing description, unless otherwise specified, but rather should be construed broadly within the scope as defined in the appended claims

What is claimed is:

1. A camera module, comprising:
   mover mounted with a lens;
   a stator movably supporting the mover along an optical axis direction of the lens;
   a first ball aligner aligned at one side of the mover to linearly travel along the optical axis direction;
   a second ball aligner aligned at the other side of the mover to linearly travel along the optical axis direction;
   a ball distance maintainer configured to constantly keep a ball center distance, which is a distance between a center of a ball belonging to the first ball aligner and a center of a ball belonging to the second ball aligner, along a first direction perpendicular to an optical axis;
   a fixation member configured to fix a relative position of the mover relative to the stator to a first direction;
   a surface configured to permit a relative displacement of the mover relative to the stator along the first direction, and to restrict the relative displacement of the mover relative to the stator to a second direction perpendicular along the first direction; and
   a suctioner configured to absorb the mover into the stator to the second direction perpendicular to the first direction, wherein
   the fixation member restricts only one of the first ball aligner and the second ball aligner, and the surface faces only the other one of the first ball aligner and the second ball aligner; and
   wherein the fixation member includes V-shaped groves formed on a surface of the mover facing the stator and on a surface of the stator facing the mover,
   wherein the surface is disposed opposite to the stator on the mover or a surface opposite to the mover on the stator, and parallel to the first direction,
   and wherein the ball belonging to the first ball aligner, the ball belonging to the second ball aligner, and the suctioner are all arranged at one side of the stator formed in a square pillar shape.

2. The camera module of claim 1, wherein
   the fixation member is configured to fix a relative position of the mover relative to the stator to a first direction;
   the surface is configured to permit a relative displacement of the mover relative to the stator to the first direction, and to restrict the relative displacement of the mover relative to the stator to a second direction perpendicular to the first direction, and
   wherein two of the ball distance maintainer, the fixation member and the surface face the ball belonging to the first ball aligner or the ball belonging to the second ball aligner and are extended along the optical axis direction to form a ball-traveling rail, when a pressure vector is defined as applying and contacting the ball to the rail in response to a suction power of the suctioner, the pressure vector is divided into a slant pressure vector applied to a direction slanted along the first direction and the second direction, and a vertical pressure vector applied to the second direction, four slant pressure vectors each facing a different direction are applied to a side of the ball-travelling rail, and two slant pressure vectors each facing a different direction and one vertical pressure vector are applied to an other side of the ball travelling rail.

3. The camera module of claim 1, further comprising:

a magnet mounted on the mover;

a yoke mounted on the stator to be acted with an attractive force of the magnet;

a substrate provided at the yoke on a surface opposite to the magnet to be applied with an electric signal; and a coil mounted on the substrate to generate a magnetic force interacting with the magnet in response to the electric signal, and to move the mover to the optical axis direction.

4. The camera module of claim 1, wherein the fixation member is configured to fix a relative position of the mover relative to the stator to a first direction, and wherein the ball distance maintainer or the fixation member is extended to the optical axis direction to form a ball-traveling rail, the ball distance maintainer includes a 'V' shaped groove on a surface opposite to the stator at the mover or on a surface opposite to the mover at the stator, and the 'V' shaped groove is straightly extended along the optical axis direction.

5. The camera module of claim 1, wherein the fixation member faces the stator at the mover, faces a surface parallel to the first direction or faces the mover at the stator, formed on a surface parallel to the first direction along the optical axis direction, and includes a groove accommodated by a part of a ball, the groove two point-contacts the ball, the groove is provided with a first slope and a second slope slanted to the first direction and the second direction, wherein the first slope one point-contacts an area at one side of the ball, a part of the ball is accommodated into the groove by a suction power of the suctioner, the second slope one point-contacts an area at an other side of the ball, a part of the ball is accommodated into the groove by the suction power of the suctioner, wherein the ball is restricted from moving along the first direction by the suction power of the suctioner and contact with the first slope, the ball is restricted from moving along the direction by the suction power of the suctioner and contact with the second slope, and the ball fixed to the mover or to the stator by the ball distance maintainer is restricted from moving to the first direction by the fixation member, and the mover and the stator are fixed in relative positions to the first direction.

6. The camera module of claim 1, wherein the surface is configured to permit a relative displacement of the mover relative to the stator to the first direction, and to restrict the relative displacement of the mover relative to the stator to a second direction perpendicular to the first direction, and wherein the surface is parallel to the first direction, and is opposite to the stator about the ball, but is formed at a surface opposite to the mover with the ball disposed therebetween at the stator, wherein an area opposite to the surface at the mover or the stator is arranged with the ball distance maintainer with the ball disposed therebetween.

7. The camera module of claim 1, wherein the surface is configured to permit a relative displacement of the mover relative to the stator to the first direction, and to restrict the relative displacement of the mover relative to the stator to a second direction perpendicular to the first direction, wherein a stopper slope protruded from the surface is provided across the surface to the first direction, and the stopper slope prevents the ball from moving beyond an allowable scope, and two slopes forming the 'V' shaped groove is formed across the surface.

8. The camera module of claim 1, wherein the fixation member is configured to fix a relative position of the mover relative to the stator to a first direction; and the surface is configured to permit a relative displacement of the mover relative to the stator to the first direction, and to restrict the relative displacement of the mover relative to the stator to a second direction perpendicular to the first direction, wherein a stopper slope protruding from the surface is provided on both sides of the surface to the first direction, wherein the stopper slope prevents the ball from moving beyond an allowable scope, and two slopes forming the 'V' shaped groove are formed about the surface to enable the ball to ride thereon, and the fixation member and the stopper slope are configured to provide room for the ball to roll in the fixation member along the first direction.

9. The camera module of claim 1, wherein the ball distance maintainer is provided with a first installer mounted with the first ball aligner, a second installer mounted with the second ball aligner, and a connector configured to connect the first installer and the second installer to constantly maintain a gap between the first installer and the second installer, wherein the first installer and the second installer is formed on any one of the mover and the stator.

10. The camera module of claim 1, wherein a hall sensor and a coil are arranged at the one side where the ball belonging to the first ball aligner, the ball belonging to the second ball aligner, and the suctioner are all arranged.

* * * * *